United States Patent [19]
McLellan

[11] 3,980,931
[45] Sept. 14, 1976

[54] OVER VOLTAGE PROTECTOR

[76] Inventor: Norvel Jeff McLellan, 1002 N. Main St., Pleasanton, Tex. 78064

[22] Filed: May 30, 1975

[21] Appl. No.: 582,280

[52] U.S. Cl. ............................ 317/31; 317/33 VR; 323/24; 323/68
[51] Int. Cl.² .......................................... H02H 9/04
[58] Field of Search .......... 307/237; 317/31, 33 VR; 323/7, 8, 17, 22 T, 24, 68

[56] References Cited
UNITED STATES PATENTS

| | | | |
|---|---|---|---|
| 3,040,239 | 6/1962 | Walker | 323/24 |
| 3,076,925 | 2/1963 | Jackson | 323/24 X |
| 3,152,299 | 10/1964 | Leney | 323/24 X |
| 3,153,187 | 10/1964 | Klees | 323/24 X |
| 3,323,017 | 5/1967 | Powell et al. | 317/31 X |
| 3,417,292 | 12/1968 | DuPont et al. | 317/31 |

*Primary Examiner*—A. D. Pellinen
*Attorney, Agent, or Firm*—Cox, Smith, Hale & Guenther Incorporated

[57] ABSTRACT

An over voltage protector for AC power. Transistors are connected across the power line in a common base configuration with the transistor outputs being connected to the primary winding of an output transformer. A secondary winding of the output transformer in series with a zener diode is connected to the base of the transistors to prevent the output voltage across the primary winding from exceeding a predetermined level, positive or negative. A diode bridge allows current to flow in only one direction through the zener diode. Additional turns on the primary winding with a tap connection also provide voltage regulation.

10 Claims, 4 Drawing Figures

OVER VOLTAGE PROTECTOR

BACKGROUND OF THE INVENTION

The invention relates to an over voltage protector circuit and, more particularly, to an over voltage protector circuit to prevent alternating voltages commonly supplied by public utilities in excess of a predetermined level. The present invention is a very simple and economic voltage control circuit employing inexpensive components to eliminate alternating voltages in excess of a predetermined amount. Back-to-back transistors in a common base configuration are connected in series with the primary winding of an output transformer. The bias voltages being supplied to the transistors will vary with the alternating current unless the alternating current exceeds a predetermined level, positive or a negative. Once the predetermined level has been reached a zener diode in series with the secondary winding of the output transformer begins to conduct thereby preventing a further increase in the bias voltage of the transistor which, consequently, prevents a further increase in the output voltage.

BRIEF DESCRIPTION OF THE PRIOR ART

Prior to the present invention many different types of alternating current voltage limiters have been patented using rather expensive components. Many of the prior devices used silicon controlled rectifiers and/or unijunction transistors to provide rather complicated and expensive regulation circuits. A typical such example is shown in Klein (U.S. Pat. No. 3,263,157).

Other types of circuits for giving a regulated AC output use transistors which generate a square wave output. The square wave output is subsequently filtered to produce a regulated AC voltage. While such a device works, it is considerably more expensive than the present invention. A typical such device is shown in Heller et al. (U.S. Pat. No. 3,237,082).

Other types of control circuits for regulating alternating voltage typically convert the AC line voltage to DC and, thereafter, regenerate the alternating current by transistor switching with a subsequent filtering of the output to give a sine wave form.

While many different types of circuits have been designed to give a regulated AC voltage, none are practical enough to be used with household appliances to regulate the voltage being supplied thereto. It is common policy among public utilities when operating within a voltage range of 110 to 130 volts AC to supply power at a voltage approaching 130 volts AC. By supplying the higher voltage the typical appliance will consume more power than it would at the lower voltage. Since the rate being paid the public utility is based upon the power consumption, this greatly increases the revenue for the public utility at the expense of the user. Not only is there an increase in the amount being paid to the public utilities, but the components of many household devices and appliances are designed for maximum operation at 130 volts AC. When the appliances operate at or near their maximum capacity, the individual components contained therein will wear out much quicker due to the increased power consumption and current flowing therethrough. For example, the contacts in a switch will arc more and burn out much quicker.

SUMMARY OF THE INVENTION

It is an object of the present invention to provide an over voltage protector for alternating voltages.

It is a further object of the present invention to provide an inexpensive solid state circuit that may be used to prevent over voltage in normal household uses as supplied from the utility companies.

It is yet another object of the present invention to provide back-to-back transistors connected to a common base configuration for supplying voltage to the primary winding of an output transformer. The secondary winding of the output transformer is connected through a zener diode to the base of the transistors to prevent the bias voltage of the transistors from exceeding a predetermined level. This in turn prevents the output voltage from exceeding a predetermined level.

It is even another object of the present invention to provide an alternating current regulating device to be used in conjunction with normal household appliances having input transformers therein. The present invention uses transistors to feed the primary winding of the input transformer with the secondary winding being connected to the base of the transistors to prevent current therethrough in excess of a predetermined amount thereby preventing voltages in excess of a given level.

It is yet another object of the present invention to provide a very simple, economic, easy to construct control circuit that may be used to prevent excessive voltages commonly supplied by the public utility company.

It is still another object of the present invention to provide regulation and over voltage protection by amplifying low voltages in a primary winding of an output transformer, and to prevent excessive voltages by zener diode control of the bias voltage of transistors. The control point of the zener diode may be set by a variable resistance across a secondary winding of the output transformer.

DESCRIPTION OF THE PREFERRED EMBODIMENT

Figure 1:
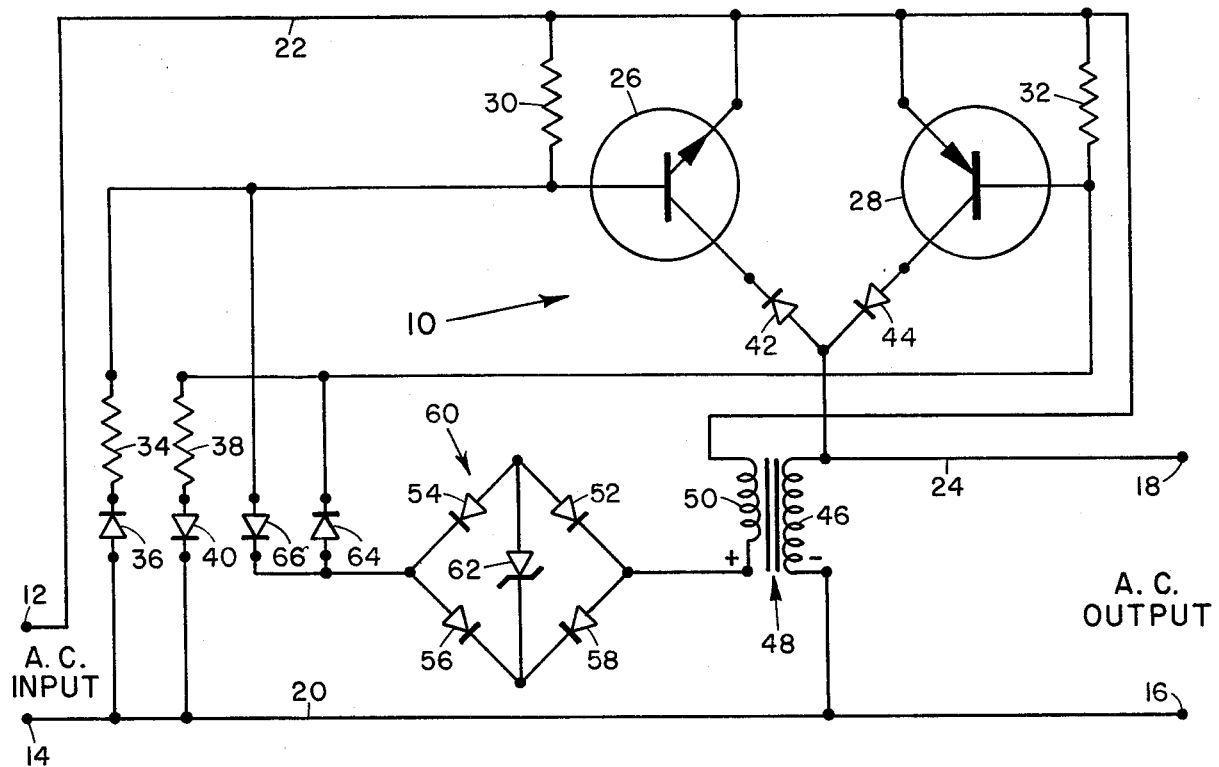
FIG. 1 is an electrical schematic of the over voltage protector.

Referring now to FIG. 1, there is shown an over voltage protector represented generally by the reference numeral 10. An AC input is fed into the input terminals 12 and 14 with the input terminal 14 connecting directly to output terminal 16. The over voltage protector 10 is connected between input terminal 12 and output terminal 18. The normal AC input being fed into input terminals 12 and 14 is the standard line voltage being supplied by a public utility at 60 cycles per second and normally between the range of 110 to 130 volts rms. For the purposes of this patent application, the base line of the schematic connecting input terminal 14 and output terminal 16 shall be called reference ground 20. The input terminal 12 connects to the input voltage line 22 and the output 18 connects to the output voltage line 24.

Transistors 26 and 28 are connected through their emitters to the input voltage line 22. Transistor 26 is of the NPN type and transistor 28 is of the PNP type. Transistors 26 and 28 have basically the same characteristics except one operates with the negative voltage and the other operates with the positive voltage of an AC wave form. The base of transistor 26 is connected through resistor 30 to the input voltage line 22, and the base of transistor 28 is connected through resistor 32 to the input voltage line 22. A voltage divider network is formed by resistors 30 and 34 which connect in series with diode 36 between the input voltage line 22 and reference ground 20. Likewise the resistor 32 and resistor 38 connect in series with diode 40 to form a voltage dividing network between the input voltage line 22 and reference ground 20.

The collector output of each of the transistors 26 and 28 are connected through diodes 42 and 44, respectively, to the output line voltage 18. Between the output voltage line 24 and reference ground 20 is the primary winding 46 of iron core AC transformer 48. A secondary winding 50 of the transformer 48 is connected to the input voltage line 22. The sign of the voltages produced in the transformer by mutual inductance is indicated in the drawing. A secondary winding 50 is connected in series with a bridge circuit composed of diodes 52, 54, 56, 58, connected as shown in the drawing, with the bridge being represented generally by reference numeral 60. Across the bridge is connected a zener diode 62. On the side opposite from secondary winding 50, bridge 60 is connected through diode 64 to the base of transistor 28, and through diode 66 to the base of transistor 26.

Because transistors 26 and 28 are in a common base configuration with the input signal being applied between the base and emitter, the voltage output for the transistor will be substantially identical to the voltage input, except when zener diode 62 is conducting as will be subsequently described. Assume now that the AC input across input terminals 12 and 14 is 110 volts rms, 60 cycles per second, as would be the minimum voltage to be supplied by a public utility to individual users. On the positive half cycle of the AC input, current will begin flowing through resistors 32 and 38 and diode 40. The voltage developed across the emitter-base of transistor 28 will cause it to begin conducting. Current will flow through transistor 28, diode 44 and primary winding 46 to the reference ground 20. The voltage developed across primary winding 46 will follow the AC input voltage, therefore, developing an AC output between output terminals 16 and 18 essentially equal to the AC input.

During the negative half cycle the conduction of transistor 28 stops with diode 40 preventing any reverse flow through resistors 38 and 32. Current will begin to flow through diode 36 and resistors 34 and 30 to develop a base-emitter voltage across resistor 30. This will cause transistor 26 to begin conduction with the current flowing from the reference ground 20, through primary winding 46, diode 42 and transistor 26 to the input line voltage 22. Again the AC input will be reflected across primary winding 46 to the AC output as was the case on the previous half cycle.

Figure 4:
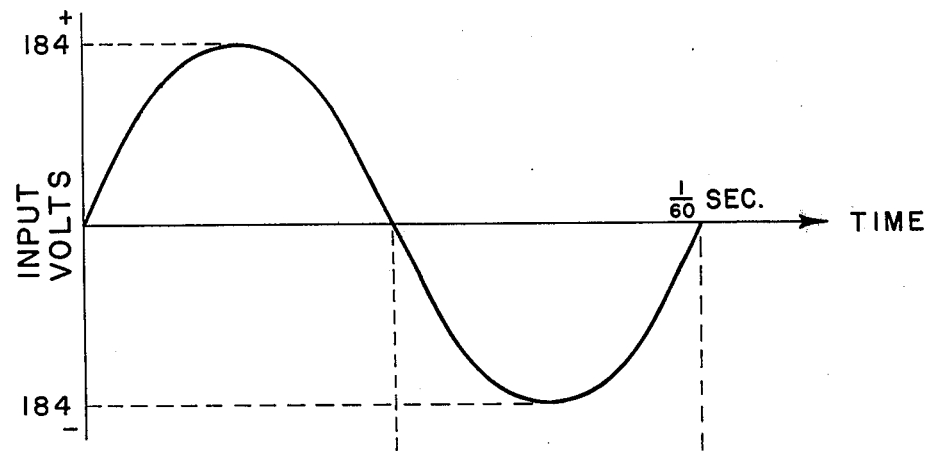
FIG. 4 is an input and output voltage wave form of FIG. 1 when an excessive AC voltage is being supplied to the over voltage protector.
Figure 4:
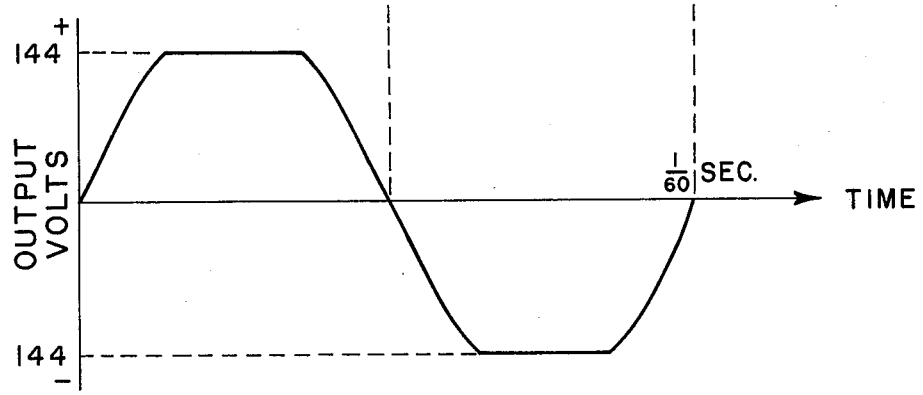

Assume now that the voltage of the AC input has increased to approximately 130 volts rms which is equivalent to approximately 184 volts peak-to-peak as is shown in the input voltage wave form of FIG. 4. Since the peak of the 110 volts rms is approximately 144 volts, the over voltage protector will be set for 144 volts peak-to-peak as is shown in the output voltage wave form of FIG. 4, which will be described in more detail subsequently.

During the positive half cycle, transistor 28 will begin conduction as before with the AC output following the AC input until the AC input reaches approximately 144 volts. At the point the mutual inductance between the primary winding 46 of transformer 48 and the secondary winding 50 has generated sufficient voltage across the secondary winding 50 with the sign being as indicated in the drawing, zener diode 62 will break down allowing conduction. Current will flow through diode 58, zener 62, diode 54 and diode 64 to the base of transistor 28. Resistor 32 is in parallel with secondary winding 50, bridge circuit 60 and diode 64, all of which have very little or no reaction to current flow for AC input voltage exceeding +144 volts. Therefore, since the bias voltage across resistor 32 cannot increase by increased current flow therethrough, the current flow through transistor 28 will not increase. Continuing with the positive half cycle of the AC input, once the voltage drops below 144 volts, the output has developed across the primary winding 46 will again trace the input voltage.

During the negative half cycle transistor 26 will trace the input until the input voltage reaches approximately −144 volts. The mutual inductance of the iron core transformer 48 will cause the voltage to be developed across the secondary winding 50 in the opposite direction as shown in FIG. 1. This voltage will be reflected across zener diode 62, which will begin conducting to allow current to flow through diodes 66 and 56, zener diode 62, diode 52 and secondary winding 50 to the input voltage line 22. Again since there is very little or no resistance to current flow through the bridge 60 for voltages in excess of −144 volts, the bias voltage being developed across resistor 30 for transistor 26 will remain eventually constant until the input voltage drops below −144 volts.

The wave forms of the input voltages and output voltages as previously described are shown in FIG. 4 wherein the peaks of the positive and the negative half cycles of the AC input have been clipped to prevent an output voltage in excess of the predetermined maximum voltage. While there may be a slight variation in the average voltage as determined by the area under the wave form and the average voltage of 110 volts rms, the over voltage protector 10 has effectively prevented excessive power dissipation or damage caused by excessive voltage commonly supplied by public utilities.

Figure 2:
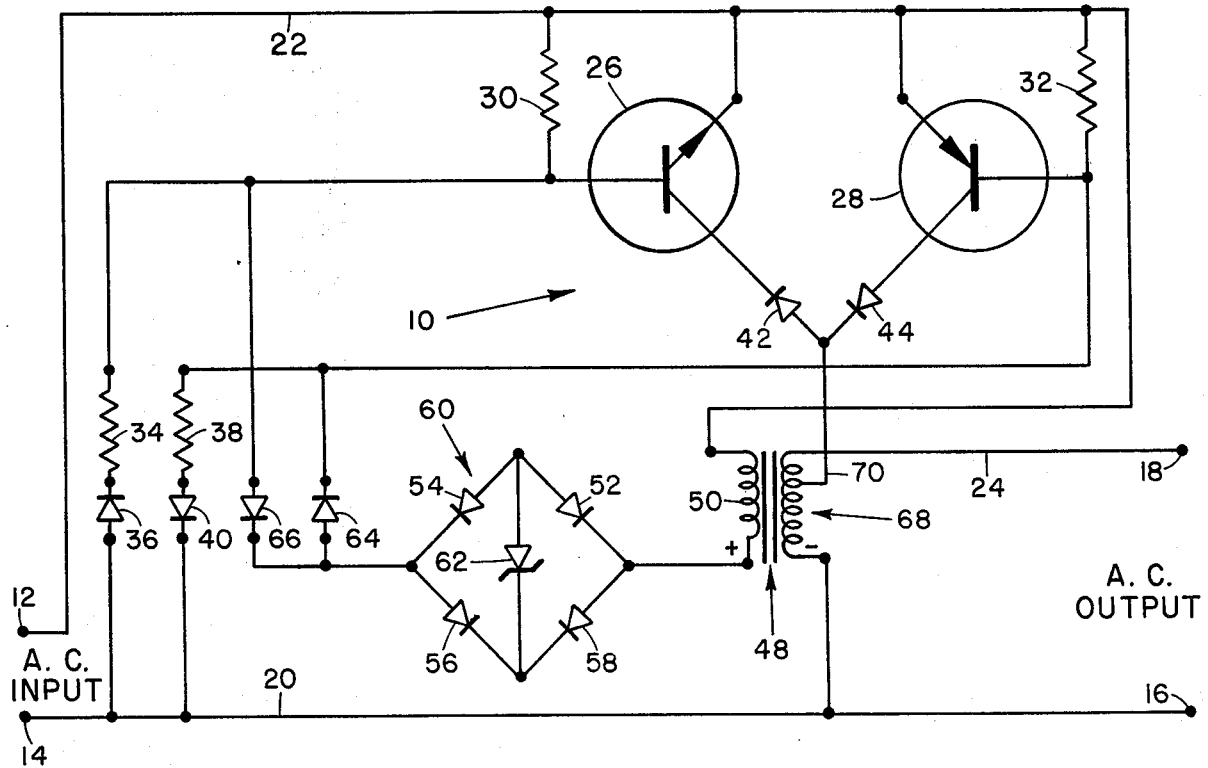
FIG. 2 is an electrical schematic of a first alternative embodiment of the over voltage protector.

Referring now to FIG. 2 like numbers are used to designate like components with the essential difference being in the secondary winding 68. The secondary winding 68 has a tap connection 70 wherein approximately 9/10 of the secondary winding 68 is located between the tap connection 70 and ground reference 20. This allows a step up in the output voltage of approximately 10%. Since there are major fluctuations in the voltage being supplied by public utilities, under voltages commonly called brown outs are quite common. This is especially true in certain areas of the country at given times during the day when the weather is very hot or very cold. By use of the tap connection 70 in primary winding 68, the over voltage protector circuit 10 can also be used as a voltage regulator. Zener diode 62 may have to be changed depending upon changes in the transformer 48 to allow conduction at the maximum desired peak voltage.

Figure 3:
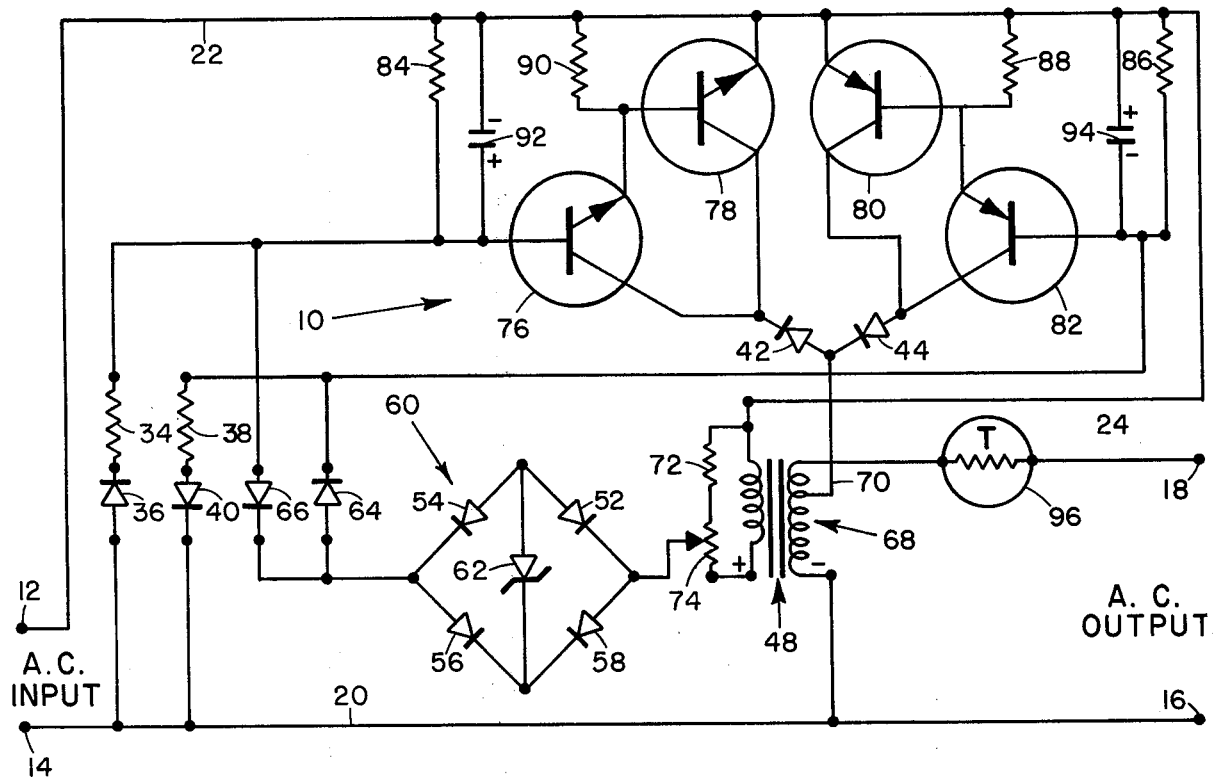
FIG. 3 is an electrical schematic of a second alternative embodiment of the over voltage protector.

Referring now to FIG. 3 of the drawings again like numbers will be used to designate like components to show a further alternative embodiment of the present invention. FIG. 3 embodies the voltage regulation feature as previously explained in conjunction with FIG. 2 by the use of the tap connection 70 of primary winding 68.

The secondary winding 50 of the transformer 48 has a resistor 72 and variable resistor 74 connected in parallel therewith. The wiper arm of the variable resistor 74 connects to the bridge circuit 60. By moving the wiper arm of the variable resistor 70, the trigger point for conduction of zener diode 62 may be varied to vary the maximum output voltage reflected across output terminals 16 and 18.

Transistor 26 has been replaced in FIG. 3 by a Darlington connection of transistors 76 and 78. Transistor 28 has been replaced by a Darlington connection of transistors 80 and 82. Now the bias voltage for transistor 76 is provided by resistor 84, and the bias voltage of transistor 82 is provided by resistor 86. During the positive half cycle of the AC input, current will flow through resistor 86 thereby causing transistor 82 to conduct. Conduction of transistor 82 will cause a current to flow through resistor 88 also causing transistor 80 to conduct. The outpputs of transistors 80 and 82 are connected together to allow current flow through diode 44. Likewise, during the negative half cycle of the AC input, the voltage developed across resistor 84 will cause transistor 76 to conduct. In turn, the voltage developed across resistor 90 will cause transistor 78 to conduct. The collectors of transistor 76 and 78 are connected together to allow current flow through diode 42. By connection of capacitors 92 and 94 across the bias resistors 84 and 86, respectively, reaction of the Darlington transistors 76, 78, 80 and 82 is slightly delayed by the RC time constant. This causes the output voltage as developed across the primary winding 68 to more closely resemble a sign wave form.

In the output voltage line 24 is a thermistor 96 that allows current flow therethrough upon heating of the resistive element. The purpose of the thermistor 96 is to allow a slow turn on time for inductive loads such as motors. It should be realized that the AC output voltage wave form for FIG. 3 will be slightly different from the output voltage wave form as shown in FIG. 4. Initially the wave form will be considerably smaller in aptitude with a gradual increasing in aptitude as the thermistor 96 heats. After the thermistor 96 has been heated it will no longer have an appreciable effect on the over voltage protector 10. If the AC input voltage exceeds the maximum desired, as was previously explained in conjunction with FIG. 1, then the output voltage wave form will be similar to that shown in FIG. 4, except it will more closely resemble a sine wave due to the charging and discharging of capacitors 92 and 94.

I claim:

1. A regulator for controlling voltage delivered to a load from an alternating voltage, said regulator comprising:
    a pair of transistor means for connecting to a voltage source;
    first means for biasing a first of said transistor means into conduction during one of the half cycles of said alternating voltage;
    second means for biasing a second of said transistor means into conduction during the other of the half cycles of said alternating voltage;
    outputs of said transistor means being connected to a first winding of an output transformer for producing an output voltage thereacross, said first winding being an output side of said output transformer;
    a second winding of said output transformer being connected in series with a voltage control means, both said second winding and said voltage control means being connected in parallel with said first and second biasing means to prevent a bias voltage in excess of a predetermined level thereby preventing said output voltage from exceeding a predetermined absolute voltage.

2. The regulator as recited in claim 1 wherein said voltage control means is a diode bridge with a zener diode connected thereacross, if voltage across said zener diode exceeds a predetermined level, said zener will conduct.

3. The regulator as recited in claim 2 further includes first diode means to prevent reverse current flow through said first and second bias means.

4. The regulator as recited in claim 3 further includes second diode means to prevent the output of either transistor means from reaching the other transistor means.

5. The regulator as recited in claim 1 further including two parts to said first winding, the first part receiving current from said first and second transistor means and the second part providing voltage amplification by mutual inductance of said output transformer, both said first and second part being connected in series for said output voltage to develop thereacross.

6. The regulator as recited in claim 5 further including variable resistance means in parallel with said second winding for setting a control point of said voltage control means.

7. The regulator as recited in claim 6 wherein said first and second transistor means is formed from two Darlington circuits.

8. The regulator as recited in claim 7 wherein said first and second bias means includes a time constant for delayed reaction of said first and second transistor means, respectively.

9. The regulator as recited in claim 8 further including means for preventing excessive initial currents.

10. The regulator as recited in claim 9 wherein:
    said voltage control means is a zener diode across a diode bridge;
    said preventing means is a thermistor; and
    said time constant is capacitive means in parallel with resistor means for forming said bias means.

* * * * *